United States Patent
Haberman et al.

(10) Patent No.: US 9,473,800 B1
(45) Date of Patent: *Oct. 18, 2016

(54) SYSTEMS AND METHODS FOR CLIENT-BASED ADDRESSABLE ADVERTISING

(71) Applicant: VISIBLE WORLD, INC., New York, NY (US)

(72) Inventors: Seth Haberman, New York, NY (US); Gerrit Niemeijer, Maplewood, NJ (US); Alex Jansen, New York, NY (US); Erik van de Pol, South Orange, NJ (US)

(73) Assignee: Visible World, Inc., New York, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/312,676

(22) Filed: Jun. 23, 2014

Related U.S. Application Data

(63) Continuation of application No. 11/939,423, filed on Nov. 13, 2007, now Pat. No. 8,763,029.

(60) Provisional application No. 60/858,531, filed on Nov. 13, 2006, provisional application No. 60/858,549, filed on Nov. 13, 2006.

(51) Int. Cl.
*H04N 7/10* (2006.01)
*H04N 21/262* (2011.01)
*H04N 21/2543* (2011.01)
*H04N 21/81* (2011.01)
*H04N 21/433* (2011.01)

(52) U.S. Cl.
CPC .. *H04N 21/26241* (2013.01); *H04N 21/25435* (2013.01); *H04N 21/4331* (2013.01); *H04N 21/812* (2013.01)

(58) Field of Classification Search
CPC .................. H04N 21/23424; H04N 21/26241
See application file for complete search history.

(56) References Cited

U.S. PATENT DOCUMENTS

| | | | | |
|---|---|---|---|---|
| 6,029,045 A * | 2/2000 | Picco | ...... | H04N 7/165 348/E5.002 |
| 8,763,029 B1 * | 6/2014 | Haberman | ....... | H04N 21/25435 725/32 |
| 2002/0083441 A1 * | 6/2002 | Flickinger | .............. | G06Q 30/02 725/32 |
| 2002/0087978 A1 * | 7/2002 | Nicholson | .............. | H04N 7/173 725/34 |
| 2002/0184091 A1 * | 12/2002 | Pudar | ...... | G06Q 30/02 705/14.62 |
| 2006/0293954 A1 * | 12/2006 | Anderson | .............. | G06Q 30/02 705/14.1 |
| 2007/0113243 A1 * | 5/2007 | Brey | ...... | G06Q 30/02 725/32 |

* cited by examiner

*Primary Examiner* — Junior Mendoza
(74) *Attorney, Agent, or Firm* — Pepper Hamilton LLP

(57) ABSTRACT

In accordance with the present invention, systems and methods that allow a television broadcast facility or a headend to insert in-band messages, where the inserted message allow receivers to switch to, insert, or otherwise show addressable advertisements to its viewers.

11 Claims, 2 Drawing Sheets

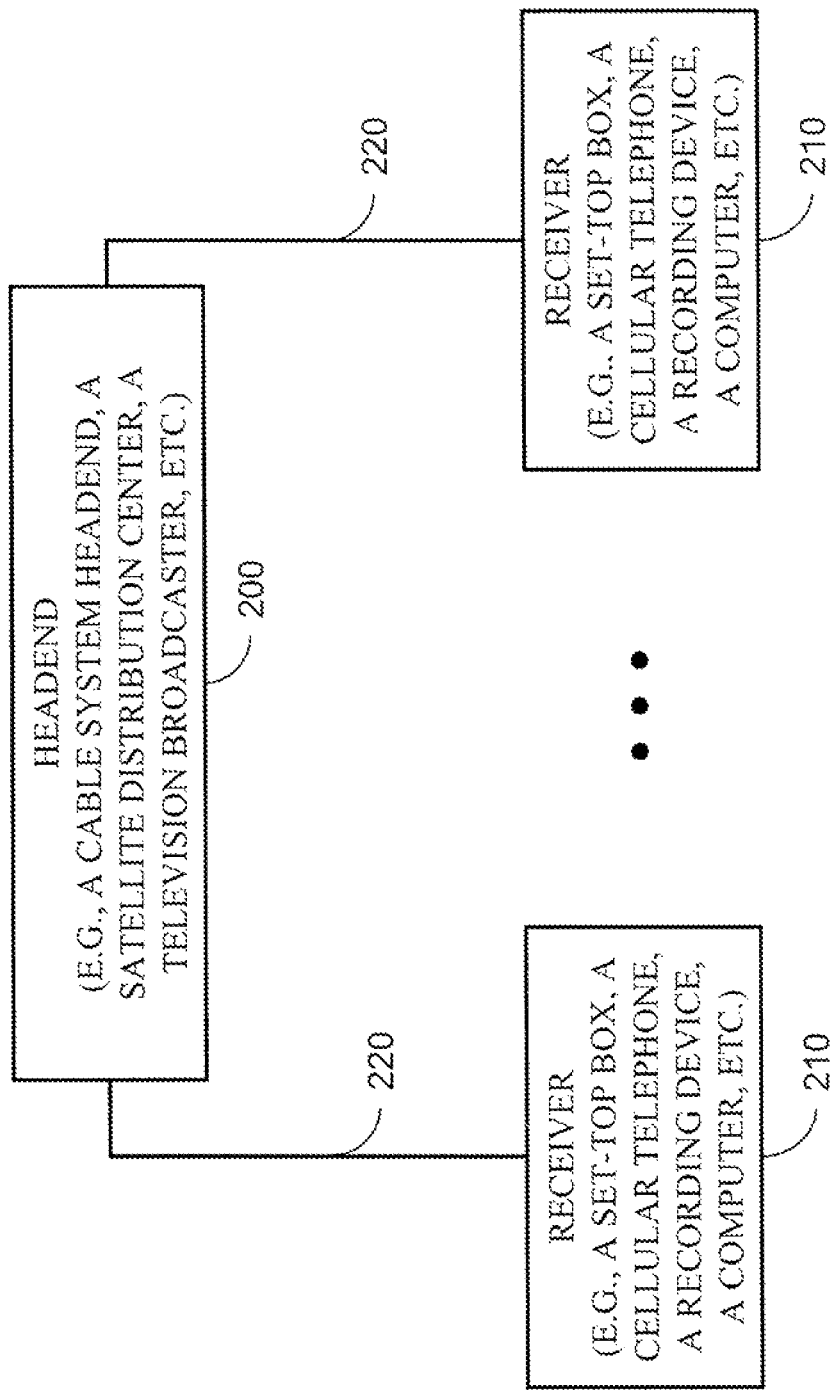

SYSTEMS AND METHODS FOR CLIENT-BASED ADDRESSABLE ADVERTISING

CROSS-REFERENCE TO RELATED APPLICATIONS

This application claims the benefit under 35 U.S.C. §119(e) of U.S. Provisional Patent Application No. 60/858,549, filed Nov. 13, 2006 and U.S. Provisional Patent Application No. 60/858,531, filed Nov. 13, 2006, which are both hereby incorporated by reference herein in their entireties.

FIELD OF THE INVENTION

The present invention generally relates to systems and methods for addressable advertising. More particularly, the present invention relates to a digital program insertion application that allows television distribution networks and cable headends to insert in-band messages into feeds to a receiver, where the receiver is capable of switching to and/or inserting addressable advertisements into a television signal.

BACKGROUND OF THE INVENTION

As the demand for digital programming continues to grow, cable television providers are transitioning from analog cable transmission systems to hybrid analog/digital and all-digital cable distribution systems. With this transition, the current distribution of television messages, such as commercials, from an originator (e.g., an advertiser) or distributor to one or more television broadcast facilities and/or cable television providers, does not easily allow for the insertion of personalized commercials or messages.

Conventional analog advertisement insertion systems distributed programs as NTSC video with analog cue-tones to cable headends. These analog cue-tones provided a signal for a local operator to replace a national advertisement with a local advertisement. For example, upon receiving the analog cue-tones, advertisement insertion equipment (e.g., splicers, video tape recorders, etc.) played a grouping of thirty second local advertisements. Near the end of the commercial break, the analog cue-tones received another set of cue-tones to indicate the advertisement insertion equipment to stop playing and switch back to the network feed. However, these advertisement insertion systems that use analog cue-tone systems have limited capabilities. For example, in an analog system, the insertion equipment cannot detect a program change. When a nationally broadcast sporting event goes into overtime, a low-value advertisement is usually played as originally scheduled as opposed to a high-value advertisement that could have been played.

Recently, the Society of Cable Telecommunications Engineers, Inc. (SCTE), Engineering Committee, Digital Video Subcommittee, developed a standard that supports the splicing of MPEG-2 streams for the purpose of Digital Program Insertion (DPI). This is described, for example, in Document ANSI/SCTE 35 2004, entitled "Digital Program Insertion Cueing Message for Cable," which is hereby incorporated by reference herein in its entirety. As described, SCTE 35 2004 describes a technique for notifying advertisement insertion systems and advertisement splicers of upcoming splice points and other timing information in the transport stream into which a digitally encoded advertisement or other content can be inserted. More particularly, an advertisement splicer looks for a particular message packets that are encoded into an MPEG-2 transport stream and that are identified by a unique packet identifier (PID). These particular message packets indicate when splice points occur without the need for special processing. However, the SCTE 35 2004 standard does not provide an efficient approach for providing insertion instructions and/or other commands to receivers.

More particularly, there is a need to provide commands and other data which instruct the receiver as to which transport streams to present to a viewer at the receiver. For example, Visible World provides approaches for creating personalized messages (e.g., commercials, advertisements, etc.) in commonly-assigned, co-pending U.S. patent application Ser. No. 09/841,465, filed on Apr. 24, 2001, which is incorporated herein by reference. The Visible World system, as described in U.S. patent application Ser. No. 09/841,465, is used to provide multiple advertisements, multiple media segments, and other media content at the same time, over multiple programming streams and enables headends and/or receivers to decide which of the plurality of programming streams to present to a viewer in a given break in any programming signal. Again, the SCTE 35 2004 standard does not provide an approach for providing insertion instructions and/or other commands to receivers.

Accordingly, it is desirable to provide systems and methods that overcome these and other deficiencies of the prior art.

For example, it would be desirable to provide systems and methods that allow a television broadcast facility or headend to insert messages for receiver-based digital program insertion.

For example, it would also be desirable to provide systems and methods that allow a television broadcast facility or headend to insert marker messages to receivers that provide an approach for the receiver to know where they are in the advertisement or advertising break, and to deal with error situations (e.g., when no advertising material is present).

SUMMARY OF THE INVENTION

In accordance with the present invention, a digital program insertion system is provided. Generally speaking, the system allows a television broadcast facility or headend to insert in-band receiver instruction messages. Receivers receive these in-band messages, which enable the receivers to switch to, insert, or otherwise display addressable advertisements (or segments) to the viewer.

Multiple transport streams from a headend are received at a receiver, where the multiple transport streams carry television programs and addressable advertisements (or segments of addressable advertisements). Each television program in the transport stream is made up from a set of individual data streams—e.g., one or more data streams for the video component of the television program, one or more data streams for the audio component of the television program, and one or more data streams for data (sometimes referred to as "private data") relating to the television program. The receiver that is receiving a television program looks up the set of individual data streams associated with that program by using, for example, a Program Map Table (PMT). At least one of the private data streams associated with the television program includes these in-band messages or receiver instructions that provide instructions for the receiver to display addressable advertisements. These instructions may include, for example, timing instructions (e.g., when a certain addressable advertisement or media segment should be displayed), metadata instructions (e.g., which specific addressable advertisements or media segments should be displayed), and timeline instructions (e.g., marker messages that assists the receiver in understanding the timeline of an advertisement and the commercial break and that assist the receiver handle error situations). However, these receiver instructions may include any suitable information, such as, for example, instructions to retrieve media segments from a particular data stream, instructions to construct an addressable advertisement using media segments from particular data streams, and instructions on error correction.

The receiver may use the metadata instructions to determine which addressable advertisement (or media segment) to display. The receiver may use the timeline instructions to determine when the addressable advertisement (or the media segment) should be displayed. For example, if a receiver receiving timing instructions that an upcoming addressable advertising break is sixty seconds in length and that the addressable advertising break is approaching in two seconds, the receiver looks to the previously received metadata to determine which addressable advertisements to display (e.g., advertisements A and B that are each thirty seconds in length).

Throughout the addressable advertising break (and sometimes at predetermined times before and after the advertising or commercial break), the system provides marker messages (or timeline messages) in the transport streams at, for example, regular intervals. These marker messages enable a receiver to understand the timeline within the addressable advertising break. For example, if the receiver tunes into the sixty second advertising break from another program (e.g., after a portion of the first advertisements of the advertising break has played), the receiver has missed the timing instructions. Using the marker messages, the receiver determines the next advertisement to display—e.g., advertisement B at two seconds into advertisement B after the receiver tuned into the advertising break at thirty-two seconds after the beginning of the break.

In addition, it should be noted that many conventional receivers (e.g., set-top boxes) do not have a programmable ability to detect whether or not the receiver is playing the correct audio and/or video at any point in time. That is, conventional receivers remain inactive or dormant after tuning to a particular video and/or audio stream. The marker messages of the present invention provide the receiver with an approach for continuously recognize and identify the timeline for advertising breaks or commercial breaks and its associated timing and/or metadata information. In addition, the marker messages of the present invention provide receivers with an approach for error correction. For example, marker messages may be inserted with a sub-second frequency (e.g., every 100 milliseconds). When the receiver is instructed to switch to addressable advertisement A that is in another transport stream from the stream that is carrying the television program and the addressable advertisement is not present, the receiver detects the lack of incoming marker messages and returns to the stream carrying the television program almost instantaneously as opposed to showing black screens for the remainder of the advertising break.

In accordance with some embodiments, systems and methods for inserting advertisements into a digital programming signal that is received at a receiver are provided. A plurality of transport streams from a headend are received at the receiver, where the plurality of transport streams carry a plurality of television programs, a plurality of addressable advertisements, a plurality of segments of addressable advertisements, and a plurality of receiver instructions. The plurality of receiver instructions include at least one of: timing messages, metadata messages, and marker messages. The receiver uses the timing messages to indicate when an addressable advertisement is to be displayed for an addressable advertising break. The receiver uses the metadata messages to indicate at least one of: the addressable advertisement to be selected from the plurality of addressable advertisements and a segment from the plurality of segments. The receiver uses the marker messages to identify each of the plurality of addressable advertisements, each of the plurality of segments, and a relative time position within the addressable advertising break. The marker messages are received at predetermined time intervals.

The plurality of receiver instructions are used by the receiver to switch to the addressable advertisement for the advertising break. The receiver then instructs a decoder to start decoding the addressable advertisement.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 2 is a schematic diagram of an illustrative television system on which a digital program insertion application may be implemented in accordance with some embodiments of the present invention.

DETAILED DESCRIPTION OF THE INVENTION

Figure 1:
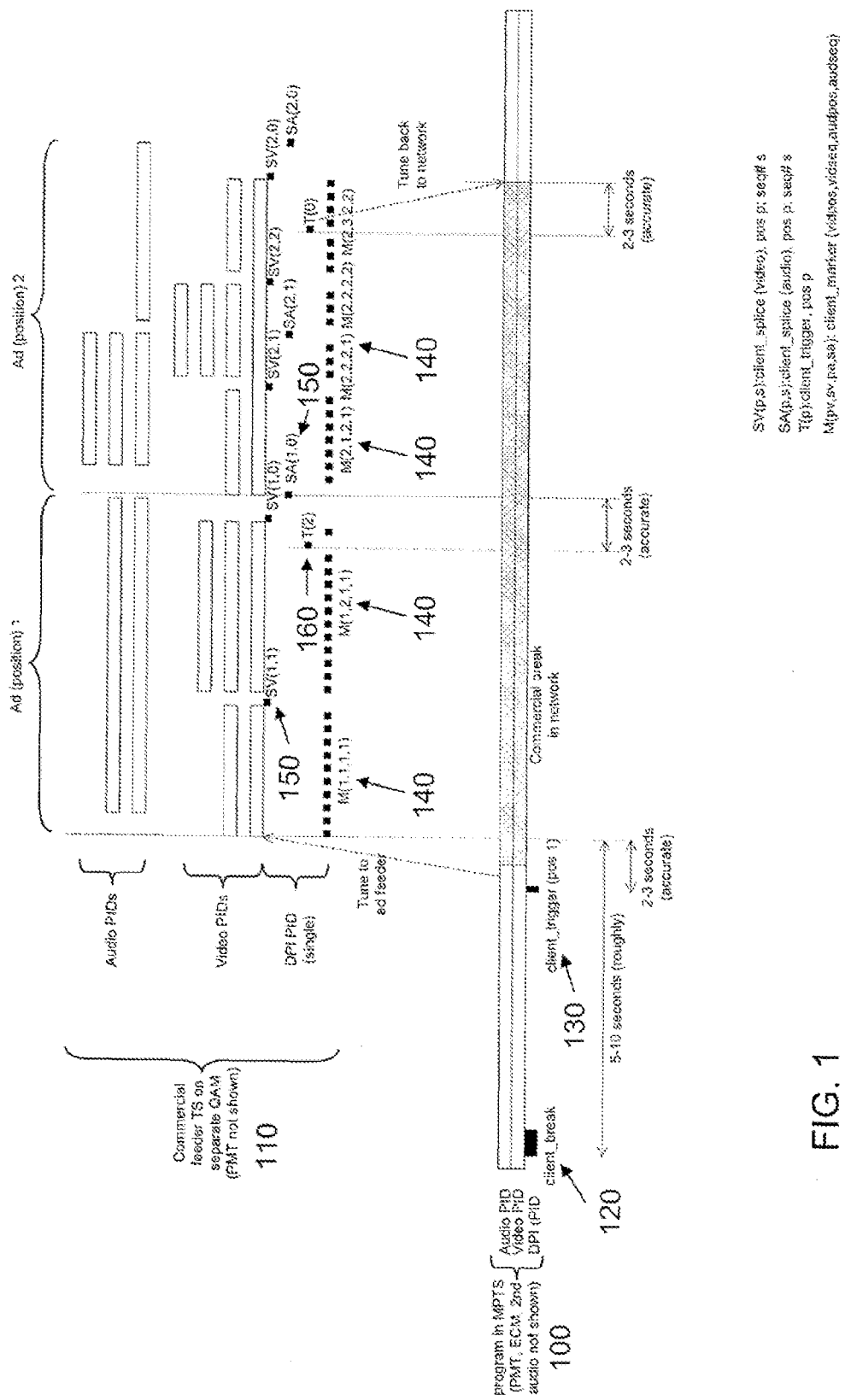
FIG. 1 is a schematic diagram showing the multiple program transport streams carrying programs, advertisements, and in-band receiver instructions (sometimes referred to herein as "DPI PID") in accordance with some embodiments of the present invention.

In accordance with the present invention, a digital program insertion system (sometimes referred to herein as "the system") is provided. The system allows a television broadcast facility or headend to insert in-band messages to receivers, where receivers may use the in-band message to switch to, insert, and/or otherwise show addressable advertisements (or segments) to viewers.

Multiple transport streams from a headend are received at a receiver, where the multiple transport streams carry television programs and addressable advertisements (or segments of addressable advertisements). Each television program in the transport stream is made up from a set of individual data streams—e.g., one or more data streams for the video component of the television program, one or more data streams for the audio component of the television program, and one or more data streams for data (sometimes referred to as "private data") relating to the television program. The receiver that is receiving a television program looks up the set of individual data streams associated with that program by using, for example, a Program Map Table (PMT). At least one of the private data streams associated with the television program includes these in-band messages or receiver instructions that provide instructions for the receiver to display addressable advertisements. These instructions may include, for example, timing instructions (e.g., when a certain addressable advertisement or media segment should be displayed), metadata instructions (e.g., which specific addressable advertisements or media segments should be displayed), and timeline instructions (e.g., marker messages that assists the receiver in understanding the timeline of an advertisement and the commercial break and that assist the receiver handle error situations). However, these receiver instructions may include any suitable information, such as, for example, instructions to retrieve media segments from a particular data stream, instructions to construct an addressable advertisement using media segments from particular data streams, and instructions on error correction.

The receiver may use the metadata instructions to determine which addressable advertisement (or media segment) to display. The receiver may use the timeline instructions to determine when the addressable advertisement (or the media segment) should be displayed. For example, if a receiver receiving timing instructions that an upcoming addressable advertising break is sixty seconds in length and that the addressable advertising break is approaching in two seconds, the receiver looks to the previously received metadata to determine which addressable advertisements to display (e.g., advertisements A and B that are each thirty seconds in length).

Throughout the addressable advertising break (and sometimes at predetermined times before and after the advertising or commercial break), the system provides marker messages (or timeline messages) in the transport streams at, for example, regular intervals. These marker messages enable a receiver to understand the timeline within the addressable advertising break. For example, if the receiver tunes into the sixty second advertising break from another program (e.g., after a portion of the first advertisements of the advertising break has played), the receiver has missed the timing instructions. Using the marker messages, the receiver determines the next advertisement to display—e.g., advertisement B at two seconds into advertisement B after the receiver tuned into the advertising break at thirty-two seconds after the beginning of the break.

In addition, it should be noted that many conventional receivers (e.g., set-top boxes) do not have a programmable ability to detect whether or not the receiver is playing the correct audio and/or video at any point in time. The marker messages of the present invention provide the receiver with an approach for continuously recognize and identify the timeline for advertising breaks or commercial breaks and its associated timing and/or metadata information. In addition, the marker messages of the present invention provide receivers with an approach for error correction. For example, marker messages may be inserted with a sub-second frequency (e.g., every 100 milliseconds). When the receiver is instructed to switch to addressable advertisement A that is in another transport stream from the stream that is carrying the television program and the addressable advertisement is not present, the receiver detects the lack of incoming marker messages and returns to the stream carrying the television program almost instantaneously as opposed to showing black screens for the remainder of the advertising break.

It should be noted that the Society of Cable Telecommunications Engineers, Inc. (SCTE), Engineering Committee, Digital Video Subcommittee, developed a standard that supports the splicing of MPEG-2 streams for the purpose of Digital Program Insertion (DPI). This is described, for example, in Document ANSI/SCTE 35 2004, entitled "Digital Program Insertion Cueing Message for Cable," which is hereby incorporated by reference herein in its entirety. In accordance with some embodiments of the present invention, systems and methods for providing in-band receiver instructions for addressable advertising may be provided. Generally speaking, these in-band messages are inserted at the headend and received by the receiver (e.g., a set-top box) and may be implemented as an extension of the SCTE 35 2004 standard. It should be noted that, unlike the in-band messages of the present invention, the messages provided by the SCTE 35 2004 standard (e.g., splice_null, splice_schedule, splice_insert, splice_signal, bandwidth_reservation) are inserted by the programmer and received (and subsequently stripped out) by advertisement splicers in headends.

It should also be noted that although the embodiments are described as being implemented on a set-top box, this is only illustrative. The systems and methods may be implemented on any suitable receiver, such as a Switched Digital Video (SDV) headend, a personal computer, a portable computer, a cellular phone, or a personal digital assistant (PDA), to provide such features.

The following protocols and their accompanying descriptions provide detailed examples of the implementation of the systems and methods of the present invention.

As shown below in Table 1, the system allows the headend to insert receiver instructions. For example, as described herein, the headend may use the system to insert client_break, client_trigger, client_splice, and client_marker instructions into the splice information table (splice_info_section) of an SCTE 35 message. It should be noted that inserting these receiver instructions into the splice information table of an SCTE 35 message implements the receiver instruction protocol as an extension of the SCTE 35 protocol. Although the embodiments are described as being implemented as an extension of the SCTE 35 protocol, this is only illustrative.

TABLE 1

| Section Element | bits | Type | Value | Encrypted |
|---|---|---|---|---|
| splice_info_section{ | | | | |
|   Table_id | 8 | uimsbf | 0xFC | 0 |
|   section_syntax_indicator | 1 | bslbf | 0 | 1 |
|   private_indicator | 1 | bslbf | 0 | |
|   reserved | 2 | bslbf | 0 | |
|   section_length | 12 | uimsbf | <4094 | 2 |
|   protocol_version | 8 | uimsbf | 0 | 3 |
|   encrypted_packet | 1 | bslbf | 0 | 4 |
|   encryption_algorithm | 6 | uimsbf | 0 | |
|   pts_adjustment | 33 | uimsbf | 0 | 5, 6, 7, 8 |
|   cw_index | 8 | uimsbf | 0xFF | 9 |
|   Reserved | 12 | bslbf | 0 | 10, 11 |
|   splice_command_length | 12 | uimsbf | | 12 |
|   splice_command_type | 8 | uimsbf | | E 13 |
|   if (splice_command_type==0x00) | | | | 14 |
|     splice_null( ) | | | | E |
|   if (splice_command_type==0x04) | | | | |
|     splice_schedule( ) | | | | E |
|   if (splice_command_type==0x05) | | | | |
|     splice_insert( ) | | | | E |
|   if (splice_command_type==0x06) | | | | |
|     splice_signal( ) | | | | E |
|   if (splice_command_type==0x07) | | | | |
|     bandwidth_reservation( ) | | | | E |
|   if (splice_command_type==0x24) | | | | |
|     client_break( ) | | | | E |
|   if (splice_command_type==0x25) | | | | |
|     client_trigger( ) | | | | E |
|   if (splice_command_type==0x26) | | | | |
|     client_splice( ) | | | | E |
|   if (splice_command_type==0x27) | | | | |
|     client_marker( ) | | | | E |
|   descriptor_loop_length | 16 | uimsbf | | E |
|   for(i=0;i<N1;i++) | | | | |
|     splice_descriptor( ) | | | | E |
|   for(i=0;i<N2;i++) | | | | |
|     alignment_stuffing | 8 | bslbf | | E |
|   if(encrypted_packet) | | | | |
|     E_CRC_32 | 32 | rpchof | | E |
|   CRC_32 | 32 | rpchof | | |
| } | | | | |

As shown in Table 2 below, the system provides the client_break message as a metadata message to instruct the receiver on which addressable advertisements to show in an upcoming break. The client_break message is generally inserted at a predetermined time before the commercial break (e.g., five seconds before, ten seconds before, etc.). It should be noted that the same client_break message may be inserted multiple times in sequence with little spacing between successive messages to handle the receiver from missing the client_break message.

TABLE 2

| Section Element | Bits | Type |
|---|---|---|
| client_break{ | | |
|   break_id | 32 | uimbsf |
|   start_time (in msec from now, pos or neg) | 32 | imsbf |
|   expiration_time (in msec from now, pos) | 32 | uimbsf |
|   num_positions | 8 | uimbsf |
|   for(i=0;i<num_positions;i++) { | | uimbsf |
|     duration (of position, in msec) | 32 | uimbsf |
|     ad_id (0=not addressable) | 16 | uimbsf |
|     ad_source (1=inter/2=intra) | 4 | uimbsf |
|     num_media_types (always 3 for now) | 4 | uimbsf |
|     for(j=0;j<num_media_types;j++) { | | uimbsf |
|       media_type_id (0=DPI protocol) | 4 | uimbsf |
|       num_pid_ranges | 12 | uimbsf |
|       for(k=0;k<num_pid_ranges;k++) { | | |
|         Offset | 13 | uimbsf |
|         num_pids | 11 | uimbsf |
|       } | | |

TABLE 2-continued

| Section Element | Bits | Type |
|---|---|---|
|       num_slots | 8 | uimbsf |
|       for(k=0;k<num_slots;k++) { | | uimbsf |
|         num_options | 16 | uimbsf |
|         duration (of slot, in msec) | 32 | uimbsf |
|       } | | |
|     } | | |
|   } | | |
|   frequency (in Mhz, mid-band. Ex: 57 MHz) | 16 | uimbsf |
| } | | |

In this embodiment, the client_break message includes the following fields:

break_id—This field is generally unique for each break, for example, to avoid multiple breaks with the same break_id being active in the receiver. This field may be managed and assigned by the advertisement inserter in the headend.

start_time—This field indicates the approximate time until the start of the break.

expiration_time—This field is generally provided a few seconds after the commercial break has ended and is used by the targeted engine as a timeout instruction to create a playout report. For example, for a 120 second commercial or network break, the expiration_time field may be set to 125 seconds. After the time has expired, no additional messages are permitted on the television program for that break. It should be noted that, if this value is too short, it may lead to race conditions within the receiver. However, if the value of this field is too long, the receiver is delayed in creating and sending a playout report, which may lead to a loss of the playout report (e.g., due to receives rebooting in the meantime).

num_positions—This field indicates the number of positions (e.g., advertisements, media segments, advertising segments, or other media) in the break.

ad_id—For each position, this field provides a unique identifier for the advertisement in that position. This field is used by the receiver to determine the sequence of media segments to display for that advertisement (e.g., this sequence may be distributed out-of-band ahead of time). It should be noted that, in some embodiments (e.g., the Visible World system), advertisements may consist of a sequence of separate audio, video, and/or other media segments that are to be displayed or constructed in a particular sequence to show the full completed advertisement. In some embodiments, an ad_id set to 0 is used for an advertisement that is copied from the stream carrying the television program, which is not an addressable advertisement.

num_media_types—For each position, this field indicates the number of media types. For example, num_media_types may be set to 3 to indicate the receiver instruction protocol, Video, and Audio media types. In another example, Secondary Audio Programming (SAP) may be supported as an additional media type.

media_type_id—For each position and each media type, this field provides an identifier for the media type. For example, a media_type_id set to 0 indicates the receiver instruction protocol, a media_type_id set to 1 indicates Video, and a media_type_id set to 2 indicates Audio.

num_pid_ranges—For each position and each media type, this field indicates the number of PID ranges. PID ranges are generally used to map metadata instructions to actual media streams (PIDs) of the addressable advertisements.

num_slots—For each position and each media type, this field indicates the number of micro switch points within the advertisement. A micro switch point (sometimes referred to as a "slot") refers to a transition between two media segments within an addressable advertisement. For example, if an addressable advertisement is thirty seconds long that includes a generic twenty second beginning portion of the addressable advertisement, and multiple different ten second end-tags or endings, then there is one micro switch point that occurs twenty seconds into the advertisement.

num_options—For each position, each media type and each micro switch point, this field indicates the number of different options (PIDs) to choose from for the switch point.

duration—For each position, each media type, and each micro switch point, this field indicates the length of the media segment (e.g., in milliseconds). The duration fields add up to the total position duration. The receiver uses the duration field to set a timeout to tune back to the network (e.g., if the client_trigger to return to the network feed is missed).

It should be noted that the frequency field (mid-band in megahertz) indicates the frequency of the commercial feeder. The commercial feeder is the transport stream that contains the addressable advertisements (or segments). It should also be noted that the frequency for the television program may be different from the frequency for the commercial feeder, or it may be the same (depending on whether the addressable advertisements are carried in separate transport streams or not.

As shown in Table 3 below, the system provides the client_trigger message as a timing message for the receiver to determine when to switch to an addressable advertisement. It should be noted that this embodiment includes two different types of timing messages: one to instruct the receiver to change frequency to an addressable advertisement (client_trigger), and one to instruct the receiver to switch streams within the same transport stream to an addressable advertisement or segment (client_splice). The client_trigger message is generally inserted at a predetermined time before the advertisement (e.g., two seconds before, five seconds before, etc.).

TABLE 3

| Section Element | bits | Type |
| --- | --- | --- |
| client_trigger{ | | |
| break_id | 32 | uimbsf |
| pos_in_break(1=start of first, 0=end of last) | 8 | uimbsf |
| relative_time (in msec) | 32 | uimbsf |
| } | | |

In this embodiment, the client_trigger message includes the following fields:

break_id—This field is generally unique for each break and identifies the break to which this trigger message belongs.

pos_in_break—This field indicates the position in the upcoming advertising break. For example, trigger messages with a position of 1 are inserted on the program and represent the first advertisement in a break.

relative_time—This field indicates the time until the first byte of the addressable advertisement on the advertisement feeder is received or the first byte of the program after the break is received.

As shown in Table 4 below, the system provides the client_splice message as another type of timing message. The client_splice is used to inform the receiver of micro switches, where a seamless transition between two media segments is required (PID switching within the same transport stream). The client_splice message is generally inserted such that the switch should be made within a given number of milliseconds (e.g., less than or equal to fifty milliseconds) of the point in the stream to avoid a video and/or an audio glitch. It should be noted that, similar to the client_break message, the client_splice message may be inserted multiple times in sequence with little spacing between successive messages to handle the receiver from missing the client_splice message.

TABLE 4

| Section Element | bits | Type |
| --- | --- | --- |
| client_splice{ | | |
| pos_num (1=first pos. in break,...) | 8 | uimsbf |
| media_type (1=vid, 2=aud) | 4 | uimsbf |
| seq_num (1=end of first, 0=end of last) | 12 | uimsbf |
| pos_num_other | 8 | uimsbf |
| media_type_other | 4 | uimsbf |
| seq_num_other | 12 | uimsbf |
| } | | |

In this embodiment, the client_splice message includes the following fields:

pos_num—This field indicates the position in a particular advertisement break. For example, a local break of 60 seconds may have between 1 and 4 positions (addressable advertisements) in it, where the positions starts counting from 1.

media_type—This field identifies the media for which the switch is intended. For example, a media_type set to 1 may indicate that video is to be switched, while a media_type set to 2 may indicate that audio is to be switched.

seq_num—This field identifies the sequence number of the switch message (micro switch point). For example, a seq_num of 0 indicates the last micro switch point in the stream to the receiver.

As shown in Table 5 below, the system provides the client_marker message as a timeline (or marker) message. In some embodiments, the receiver uses client_marker messages for error-detection. The client_marker message allows the receiver to detect if it is on the wrong frequency or if the receiver has otherwise switched to the wrong commercial (e.g., by detecting the incoming client_marker messages present in the advertisement the receiver has switched to). If, for example, the receiver detects that the commercial feeder is not present, that an addressable advertisement is not present on the commercial feeder, or that the receiver switched to the wrong addressable advertisement, the receiver tunes back to the network as soon as client_marker messages are not received (or if the wrong client_marker messages are received) within a predetermined time (e.g., after a few milliseconds). It should be noted that the client_marker message includes the same fields as the above-described client_splice message. In addition, the client_splice message includes an elapsed_time field for each media type, which indicates the time since the previous micro switch point for that media type (the start of the current microswitch point in the position being played). The elapsed_time field may be used for tracking or debugging purposes.

TABLE 5

| Section Element | bits | Type |
| --- | --- | --- |
| client_marker{ | | |
|   Pos_num_1 (1=first pos in break,...) | 8 | uimsbf |
|   media_type_1 (1=vid, 2=aud) | 4 | uimsbf |
|   Seq_num_1 (1=first slot in pos,...) | 12 | uimsbf |
|   elapsed_time_1 (in msec from start of slot). | 32 | uimsbf |
|   Pos_num_2 | 8 | uimsbf |
|   media_type_2 | 4 | uimsbf |
|   Seq_num_2 | 12 | Uimsbf |
|   elapsed_time_2 | 32 | Uimsbf |
| } | | |

Marker messages are inserted throughout the addressable advertising break (and sometimes starting a few seconds before the start of an advertising break and ending a few seconds after the end of the advertising break) with a fixed, sub-second frequency. For example, marker messages may be inserted with a sub-second frequency of every 100 milliseconds. It should be noted that other frequency values may be used.

In some embodiments, marker messages (e.g., client_marker of Table 5) may be used by the receiver to tune to the correct addressable advertisement. For example, if the receiver tunes to a channel at a given time after the trigger message (e.g., client_trigger message) has been transmitted, the receiver receives the next marker message, which synchronizes the receiver and provides the information to the receiver to tune to the correct addressable advertisement.

In other embodiments, marker messages may be present (during the break) in both the television program as well as in the addressable advertisements. This enables the receiver that tunes into an addressable advertising break, to still switch to (or otherwise display) the correct addressable advertisement. For example, if the receiver tunes into the sixty (60) second advertising break from another program (e.g., after a portion (32 seconds) of the advertising break has played), the receiver has missed the timing instructions. Using the marker messages, the receiver determines the next advertisement to display—e.g., advertisement B at two seconds into advertisement B after the receiver tuned into the advertising break at thirty-two (32) seconds after the beginning of the break.

FIG. 1 is an illustrative example of program and targeted advertisements with receiver instructions in accordance with some embodiments of the present invention. As shown in FIG. 1, the programs and their accompanying content (e.g., an audio PID, a video PID, a receiver instruction PID, a Program Map Table, Entitlement Control Messages, etc.) are transmitted on a multiple program transport stream (MPTS) 100. The addressable advertisements and their associated individual data streams (e.g., one or more audio PIDs, one or more video PIDs, a receiver instruction PID, a Program Map Table, etc.) are transmitted on a separate multiple program transport stream 110 (e.g., a commercial feeder transport stream).

It should be noted that although FIG. 1 describes the intra-transport stream switching cases, where the targeted advertisement (commercial feeder transport stream 110) is on a separate QAM, this is only illustrative. The application and its DPI messages may be used in inter-transport stream switching, where the targeted advertisement (commercial feeder transport stream) is on the same transport stream as the network. Alternatively, the targeted advertisements may be downloaded to a digital video recorder (DVR) or any other suitable recording device. The application and its DPI messages may be used to switch between a transport stream and the recording device.

As shown in FIG. 1, the commercial break in the network feed is overlaid or replaced with two targeted advertisements in the advertisement feeder multiple program transport stream (transport stream 110). Within each MPTS 100 and 10, multiple in-band client-DPI (receiver instruction) messages are inserted. For example, the client_break message 120 is inserted into the MPTS 100 to signal the receiver of an upcoming addressable advertising break. Client_break message 120 may be inserted in the MPTS about five to ten seconds prior to the receipt of a client_trigger message 130.

Client_trigger message 130 informs the receiver of the start of a new advertisement in a break or indicates the start of the television program when the last advertisement in the break has played. In response to receiving the client_trigger message 130, the receiver switches from the MPTS to the separate transport stream 110. Separate transport stream 110 includes multiple client_marker messages 140, multiple client_splice messages 150 for different media types (e.g., video, audio, etc.), and multiple client_trigger messages 160. Upon receiving the last client_trigger message—e.g., T(0), which indicates the start of the television program after the last advertisement or commercial in the break has played, the receiver tunes back to the television program on the MPTS.

An illustrative arrangement that support the insertion of in-band client-DPI (receiver instruction) messages is shown in FIG. 2. It should be noted that other arrangements may also be used.

FIG. 2 is a schematic diagram of an illustrative television system on which the application may be implemented in accordance with some embodiments of the present invention. Content, such as television programs and other media may be provided from one or more sources to headend 200. Headend 200 may be a cable system headend, a satellite distribution center, a television broadcast facility, or any other suitable facility for distributing content to viewers at one or more receivers 210.

It should be noted that there are generally numerous headends 200 or television broadcasting facilities in a television system, but only one is shown in FIG. 2 to avoid overcomplicating the drawings.

Receiver 210 may be, for example, a set-top box, a television, a Switched Digital Video (SDV) head-end, a recording device, a personal computer, a laptop computer, a personal digital assistant, a cellular telephone, or any other suitable platform. Receiver 210 may receive content, such as television programs, from headend 200 over communications link 220. Receiver 210 may also transmit signals to headend 200 over communications link 220. Communications link 220 may be cables or other wired connections, or wireless connections for broadcast or satellite links.

The receiver 210 may perform one or more of the following functions:
  when the receiver is tuned (by viewer) to a television program that is enabled for the addressable advertising system, it can detect the presence of a data stream for receiver instructions (client-DPI PID) and start monitoring the messages in it;
  receive client_break messages and store the metadata in memory for use at a later time (this metadata allows the receiver to decide which advertisements to show for an upcoming break);
  receive client_trigger messages and use them to switch/ tune to an addressable advertisement in another transport stream at the beginning of an upcoming break (based on metadata previously extracted and stored from the client_break message);

receive client_splice messages and use them to seamlessly switch to media segments within a transport stream, these can be micro switches between two media segments in the same advertisement, or between two separate advertisements;

receive client_trigger messages that indicate the end of addressable advertising elements in the commercial feeder, and use it to switch or tune back to the television program; and/or send reporting (playout) data back to the headend (within a predetermined amount of time after the end of the break, typically few seconds).

Accordingly, systems and methods that allow a television broadcast facility or headend to insert receiver instructions are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A method for inserting advertisements into a digital programming signal received at a receiver, the method comprising:
    receiving a plurality of transport streams from a headend, wherein the plurality of transport streams carries a plurality of television programs, a plurality of segments of addressable advertisements, and a plurality of receiver instructions, wherein:
        the plurality of receiver instructions comprise timing messages, metadata messages, number of slot messages, and marker messages;
        the receiver uses the timing messages to indicate when an addressable advertisement is to be displayed for an addressable advertising break;
        the receiver uses the number of slot messages to indicate a number of micro switch points within the addressable advertisement;
        the receiver uses the metadata messages to indicate the addressable advertisement to be selected from the plurality of addressable advertisements and each of the plurality of segments to be used for the micro switch points;
        the receiver uses the marker messages to identify a timeline within the addressable advertising break; and
    using the plurality of receiver instructions to assemble the addressable advertisement using the plurality of segments of addressable advertisements and switch to the addressable advertisement for the advertising break.

2. The method of claim 1, wherein the marker messages provide the receiver, at substantially any point in time, with an indication of the relative time within the addressable advertisement and the addressable advertising break.

3. The method of claim 1, further comprising:
    waiting to receive a subsequent marker message in response to not receiving the timing messages;
    receiving the subsequent marker message within the predetermined time intervals;
    determining the addressable advertisement to switch to based on the subsequent marker message.

4. The method of claim 3, further comprising tuning the receiver back to the transport stream carrying the television programs in response to not receiving the subsequent marker message within the predetermined time intervals.

5. The method of claim 1, further comprising:
    tuning to one or more data streams in response to the receiver instructions;
    receiving a marker message within a predetermined time interval; and
    determining from the received marker message whether the receiver has switched to a correct addressable advertisement.

6. The method of claim 1, further comprising:
    tuning to one or more data streams in response to the receiver instructions;
    receiving a marker message within a predetermined time interval; and
    comparing a unique identifier for the addressable advertisement or the segment associated with the marker message with previously received unique identifiers associated with previously received marker messages to determine whether the receiver has switched to a correct addressable advertisement or correct segment.

7. The method of claim 6, wherein the marker messages synchronize the receiver and provide the receiver with instructions to tune to a correct addressable advertisement.

8. The method of claim 1, further comprising:
    tuning to the addressable advertising break after the addressable advertising break has started;
    receiving a subsequent marker message in response to not receiving the timing messages; and
    determining the addressable advertisement to be played and a particular point within the addressable advertisement to start playing.

9. The method of claim 1, wherein the receiver instructions are inserted at one of: a headend and a television broadcast facility.

10. The method of claim 1, further comprising:
    receiving the timing messages to recognize when the addressable advertising break is approaching in time; and
    retrieving the metadata messages to determine which of the plurality of addressable advertisement to display.

11. A system for inserting advertisements into a digital programming signal, the system comprising:
    a receiver that is configured to:
    receive a plurality of transport streams from a headend, wherein the plurality of transport streams carries a plurality of television programs, a plurality of segments of addressable advertisements, and a plurality of receiver instructions, wherein:

the plurality of receiver instructions comprise timing messages, metadata messages, number of slot messages, and marker messages;

the receiver uses the timing messages to indicate when an addressable advertisement is to be displayed for an addressable advertising break;

the receiver uses the number of slot messages to indicate a number of micro switch points within the addressable advertisement;

the receiver uses the metadata messages to indicate the addressable advertisement to be selected from the plurality of addressable advertisements and each of the plurality of segments to be used for the micro switch points;

the receiver uses the marker messages to identify a timeline within the addressable advertising break; and using the plurality of receiver instructions to assemble the addressable advertisement using the plurality of segments of addressable advertisements and switch to the addressable advertisement for the advertising break based.

* * * * *